No. 633,465. Patented Sept. 19, 1899.
J. P. MERTES.
GARDEN TOOL.
(Application filed Dec. 9, 1898.)
(No Model.)
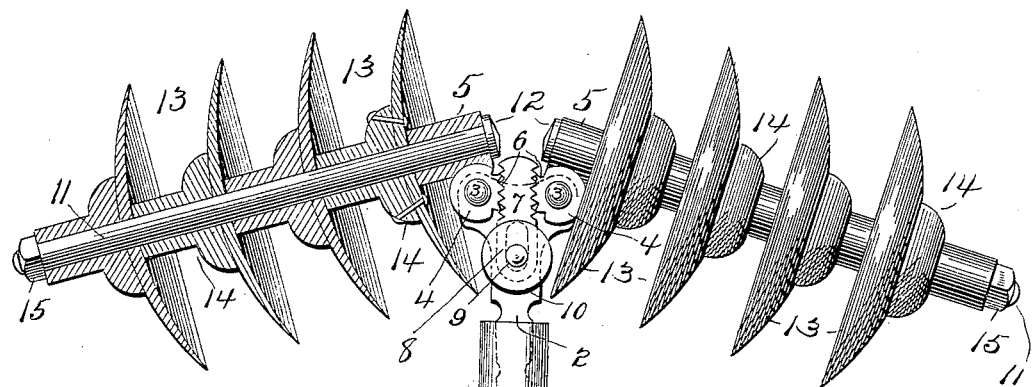
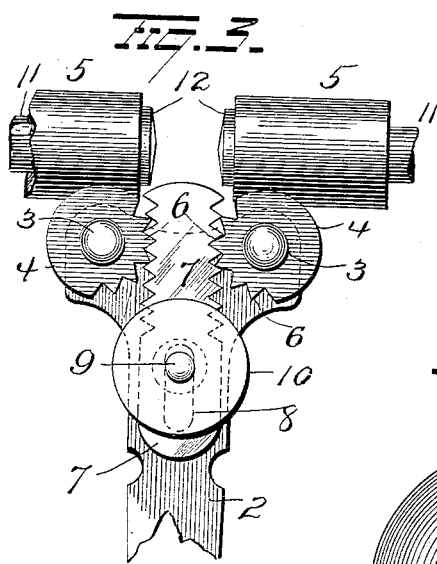
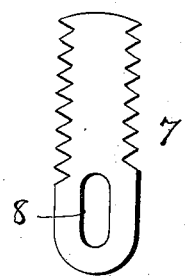
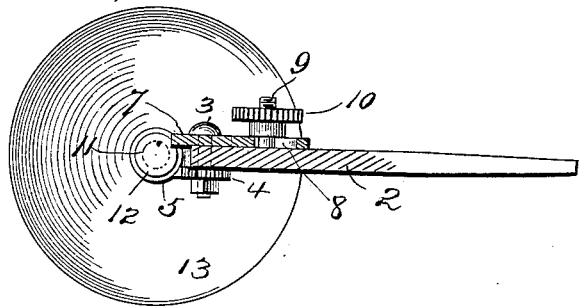
WITNESSES
E. S. Nottingham
G. F. Downing
INVENTOR
J. P. Mertes
By H. A. Seymour
Attorney
THE NORRIS PETERS CO., PHOTO-LITHO., WASHINGTON, D. C.

UNITED STATES PATENT OFFICE.

JOSEPH P. MERTES, OF JANESVILLE, WISCONSIN.

GARDEN-TOOL.

SPECIFICATION forming part of Letters Patent No. 633,465, dated September 19, 1899.

Application filed December 9, 1898. Serial No. 698,774. (No model.)

*To all whom it may concern:*

Be it known that I, JOSEPH P. MERTES, a resident of Janesville, in the county of Rock and State of Wisconsin, have invented certain new and useful Improvements in Garden-Tools; and I do hereby declare the following to be a full, clear, and exact description of the invention, such as will enable others skilled in the art to which it appertains to make and use the same.

My invention relates to an improvement in garden-tools, and more particularly to that class of tools employed for loosening up and pulverizing the ground, the object of the invention being to provide a device of the above character which will be simple in construction, easy and comparatively cheap to manufacture, and most effectual when in use.

With these objects in view the invention consists in certain novel features of construction and combinations and arrangements of parts, as will be more fully hereinafter described, and pointed out in the claims.

In the accompanying drawings, Figure 1 is a top view of my improved tool. Fig. 2 is a view in section, and Figs. 3 and 4 are views of details.

1 represents a handle of any approved form and of any desired material, in the end of which is secured a shank 2. The shank 2 is forked at its outer end and provided with holes for the passage of bolts 3, which are adapted to also pass through openings or holes in parallel circular flanges 4 on suitable sleeves 5. The flanges 4 are provided on their edge with teeth 6, adapted to engage teeth on respective sides of a key 7. The key 7 is disposed on the shank 2 and is provided with an elongated slot 8, through which a screw-threaded bolt or pin 9 extends, and a screw-threaded thumb-nut 10 is adapted to be screwed on said pin 9, whereby to securely clamp said parts in their desired position.

Rods or shafts 11, headed at their inner ends, as shown at 12, are mounted at one end in the sleeves 5 and are adapted to receive a gang of revoluble disks 13. The disks 13 are provided with collars 14, having flanged enlargements at one end whereby to secure same to the disk, and said collars 14 are adapted to separate the disks. The rods or shafts 11 are screw-threaded at their outer ends for the reception of nuts 15, whereby to secure the disks thereon.

By means of the key 7 and toothed flanges 4 the two gangs of disks can be readily adjusted relatively to each other and securely held at any desired adjustment by means of the bolt 9 and nut 10.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A garden-tool comprising gangs of revolubly-mounted disks pivotally connected at their inner ends to a shank, a key for adjusting said gangs relatively to each other and a thumb-nut adapted to secure said gangs in their adjusted position.

2. A garden-tool comprising a shank adapted to be secured to a handle and having a forked end, a sleeve having parallel enlargements disposed on each section of the forked end and each sleeve supporting a gang of disks, teeth on said enlargements, a key having an elongated slot therein, teeth on each side of said key to mesh with the toothed enlargements, a screw through said slot and shank and a thumb-nut adapted to be screwed on said screw to clamp the parts in place.

3. A garden-tool comprising a shank adapted to be secured to a handle, a forked end on said shank, having holes therein, sleeves having parallel flanged enlargements disposed one on each side of said forked end and having holes, bolts passing through said holes in the enlargements and forked end, a key disposed between the enlargements and engaging the same, a thumb-nut adapted to secure said key in place, shafts mounted in said sleeves and a gang of disks disposed on each shaft.

In testimony whereof I have signed this specification in the presence of two subscribing witnesses.

JOSEPH P. MERTES.

Witnesses:
H. A. MOESER,
ISA HOLSAPPLE.